United States Patent [19]

Josefsson

[11] Patent Number: 5,447,594
[45] Date of Patent: Sep. 5, 1995

[54] RUBBERIZED CLOTH VIBRATION AND NOISE-DAMPING SPACER FOR VEHICLE BRAKES AND METHOD FOR MAKING THE SAME

[75] Inventor: Percy Josefsson, Ljungbyholm, Sweden

[73] Assignee: Rubore Materials Sweden AB, Kalmar, Sweden

[21] Appl. No.: 781,214

[22] PCT Filed: Jul. 6, 1990

[86] PCT No.: PCT/SE90/00483

§ 371 Date: Jan. 2, 1992

§ 102(e) Date: Jan. 2, 1992

[87] PCT Pub. No.: WO91/00966

PCT Pub. Date: Jan. 24, 1991

[30] Foreign Application Priority Data

Jul. 7, 1989 [SE] Sweden .............................. 8902468

[51] Int. Cl.⁶ ............................................. B29H 9/02
[52] U.S. Cl. .................. 156/307.5; 156/307.1; 156/307.3; 156/307.7; 277/228
[58] Field of Search ............... 277/227, 228, 229, 230, 277/DIG. 6; 428/268; 188/73.37; 156/307.1, 307.3, 307.5, 307.7

[56] References Cited

U.S. PATENT DOCUMENTS

| | | | |
|---|---|---|---|
| 2,650,184 | 8/1953 | Biefeld | 428/268 |
| 3,073,004 | 1/1963 | Zeise, Jr. | 428/268 X |
| 3,262,810 | 7/1966 | Campbell | 428/268 X |
| 3,490,563 | 1/1970 | Hahm | 188/73.37 |
| 3,534,652 | 10/1970 | Zumeta et al. | 277/230 X |
| 3,930,095 | 12/1975 | van Gils et al. | 428/268 X |
| 4,022,302 | 5/1977 | Janssen | 188/73.37 X |
| 4,154,322 | 5/1979 | Yamamoto et al. | 188/73.37 |
| 4,746,565 | 5/1988 | Bafford et al. | 428/268 X |

FOREIGN PATENT DOCUMENTS 614552 2/1961 Canada ........................... 188/73.37

Primary Examiner—Daniel G. DePumpo
Attorney, Agent, or Firm—Cushman Darby & Cushman

[57] ABSTRACT

A gasket for use in an aggressive environment, e.g. as a vibration; and noise; damping spacer in vehicle brakes, has a body made of fiber cloth, at least one side of which is coated with a rubber layer penetrating into the cloth. The gasket is made by applying a rubber solution to at least one side of a body, the rubber solution thereafter being dried and vulcanised, so as to result in a thin inner rubber layer. A rubber sheet is applied to the inner layer by calendering, whereupon the applied rubber sheet is vulcanised to the inner layer.

2 Claims, 1 Drawing Sheet

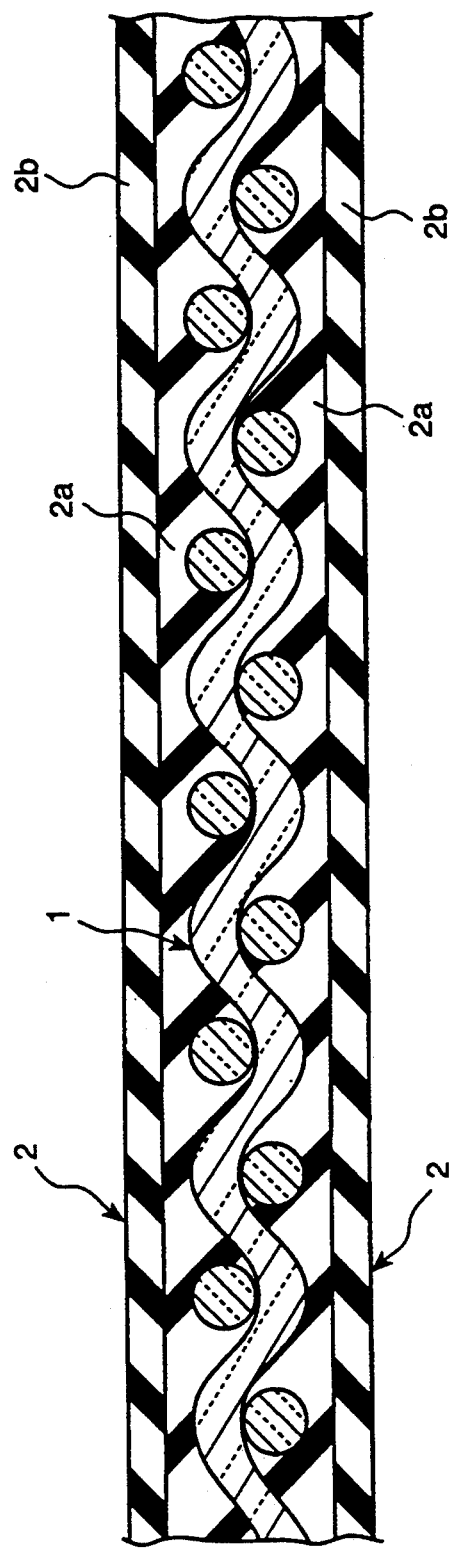

RUBBERIZED CLOTH VIBRATION AND NOISE-DAMPING SPACER FOR VEHICLE BRAKES AND METHOD FOR MAKING THE SAME

BACKGROUND OF THE INVENTION

The present invention relates to a gasket for use in an aggressive environment, e.g. as a vibration; and noise; damping spacer in vehicle brakes, as well as to a method for making such a gasket.

In disc brakes for vehicles, friction pads are pressed against a rotating disc by means of hydraulic cylinders. Many of today's disc brakes use vibration; and noise; damping spacers which are mounted on the friction pads, between the pads and the cylinders. Usually, the spacers are thin steel plates which on both sides are coated with a layer of rubber. Although such spacers function satisfactorily and give no grinding of brakes, they are unfortunately complicated to make as well as difficult to handle.

SUMMARY OF THE INVENTION

One object of the present invention is to provide a vehicle brake spacer which is much easier to make and handle.

A more general object of the invention is to provide a gasket for use in an aggressive environment, e.g. in engines, compressors, pumps and vehicle brakes. The gasket should be resistant to oil and solvents as well as to high pressures and temperatures. It should also be easy to make and handle.

According to the present invention, these objects are achieved by a gasket for use in an aggressive environment, e.g. as a vibration; and noise; damping spacer in vehicle brakes, characterised in that it has a body of fiber cloth, at least one side of which is coated with a rubber layer penetrating into the cloth and including an inner layer which is applied to the body in the form of a rubber solution, and an outer layer which, in the form of a rubber sheeting, is applied by calendering and is vulcanised to the inner layer.

Suitably, the body is made of glass fiber cloth, and the rubber layer is made of nitrile rubber.

A further object of the invention is to provide a simple method for making such a gasket.

According to the present invention, this object is achieved by a method characterised in that a rubber solution is applied to at least one side of a body of fiber cloth, that the rubber solution is dried and vulcanised, resulting in a thin inner rubber layer, that a rubber sheeting is applied to the inner layer by calendering, and that the applied rubber sheeting is vulcanised.

Suitably, the rubber solution used is a solution of nitrile rubber in alcohol.

BRIEF DESCRIPTION OF THE DRAWING

The invention will now be described in more detail, with reference to the accompanying drawing which shows a transverse cross section of a gasket provided according to the principles of the present invention.

The gasket shown in the drawing has a body 1 made of glass fiber cloth. A suitable glass fiber cloth is, for instance, the one sold by MITEX GLASFIBER AB as article number 1581-136. This cloth has a thickness of 0.21 mm. Cloths made of other fibers, such as ceramic fibers or Kevlar fibers, may also be used.

Both sides of the body 1 are coated with a layer 2 of nitrile rubber penetrating into the glass fiber cloth. In the making of the gasket, the two layers 2 are applied by pulling a web of glass fiber cloth through a solution of nitrile rubber in ethyl alcohol. The applied rubber solution is dried and hot-vulcanised so that a thin inner layer 2a which penetrates into the glass fiber cloth is obtained on both sides thereof. Then, a sheeting 2b of nitrile rubber is applied to both of the inner layers 2a by calendering, whereupon the nitrile rubber sheetings 2b are vulcanised to the inner layers 2a in a Rotocure machine to produce, on both sides of the glass fiber cloth, a nitrile rubber layer 2 made-up of an inner layer 2a and an outer layer 2b.

I claim:

1. A method for making a rubberized cloth vibration and noise-damping spacer for vehicle brakes, comprising:

providing a body of fiber cloth having two opposite sides;

applying on at least one of said sides a coating of rubber comprising rubber dissolved in a solvent, so that the rubber penetrates into the body of fiber cloth;

drying the solvent from the coating of rubber thereby providing an inner layer of rubber;

applying a sheet of rubber to said inner layer of rubber by calendaring thereby providing an outer layer of rubber; and vulcanizing said outer layer of rubber to said inner layer of rubber.

2. The method of claim 1, wherein:

said rubber dissolved in a solvent is constituted by nitrile rubber dissolved in alcohol.

* * * * *